United States Patent
Srivastava et al.

(10) Patent No.: US 8,230,387 B2
(45) Date of Patent: Jul. 24, 2012

(54) SYSTEM AND METHOD TO ORGANIZE ASSETS IN A REPOSITORY

(75) Inventors: Biplav Srivastava, Noida (IN); Karthikeyan Ponnalagu, Tamil Nadu (IN); Nanjangud C. Narendra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1301 days.

(21) Appl. No.: 11/931,338

(22) Filed: Oct. 31, 2007

(65) Prior Publication Data

US 2009/0109225 A1    Apr. 30, 2009

(51) Int. Cl.
*G06F 9/44* (2006.01)
(52) U.S. Cl. ........ 717/104; 717/121; 717/136; 717/148; 709/203; 709/204; 709/220
(58) Field of Classification Search .......... None
See application file for complete search history.

(56) References Cited

U.S. PATENT DOCUMENTS

| | | | | |
|---|---|---|---|---|
| 5,680,530 | A * | 10/1997 | Selfridge et al. | 345/440 |
| 7,580,986 | B2 * | 8/2009 | Bugaj | 709/214 |
| 7,962,891 | B2 * | 6/2011 | Kimelman et al. | 717/104 |
| 2003/0018694 | A1 * | 1/2003 | Chen et al. | 709/200 |
| 2003/0023685 | A1 * | 1/2003 | Cousins et al. | 709/205 |
| 2003/0051236 | A1 * | 3/2003 | Pace et al. | 717/177 |
| 2003/0131084 | A1 * | 7/2003 | Pizzorni et al. | 709/223 |
| 2004/0093559 | A1 * | 5/2004 | Amaru et al. | 715/502 |
| 2005/0076328 | A1 * | 4/2005 | Berenbach et al. | 717/104 |
| 2007/0094256 | A1 * | 4/2007 | Hite et al. | 707/6 |
| 2009/0178035 | A1 * | 7/2009 | Alpern et al. | 717/177 |
| 2010/0211924 | A1 * | 8/2010 | Begel et al. | 717/101 |

* cited by examiner

*Primary Examiner* — Isaac Tecklu
(74) *Attorney, Agent, or Firm* — Gibb & Riley, LLC

(57) ABSTRACT

The embodiments of the invention provide a method of organizing assets having artifacts in a repository. The method begins by organizing artifacts of at least one of the assets as internal nodes in a graph based on a context. The method simultaneously organizes the assets as external nodes in the graph based on the context. The internal nodes comprise artifacts having metadata that is updated by an artifact producer and/or an asset producer. Moreover, the external nodes comprise artifacts that are defined and/or updated by roles other than an artifact producer and/or an asset producer.

9 Claims, 8 Drawing Sheets

| Search Terms | User Intent | # Results |
|---|---|---|
| Sorting | Function | 296 (225) |
| Sorting Numbers | Function | 12 (6) |
| Sorting Documentation | Artifact | 5 (3) |
| Sorting Code | Artifact | 21 (17) |
| Sorting Program | Artifact | 64 (51) |
| Sorting Code Numbers | Function, Artifact | 0 (0) |
| Sorting Program Numbers | Function, Artifact | 2 (1) |
| Sorting Documentation Code | Artifact, Process | 1 (1) |
| Sorting Documentation Program | Artifact, Process | 1 (0) |

FIG. 1

| Name/Type | Primary Concern | Updated By | Meta-data Examples |
|---|---|---|---|
| Packaging/Internal | How the asset is available to a consumer | Producer | Part-of, Cost, Pre/Post/Co-requisites |
| Relationship/Internal | How artifacts in the asset relate to each other to form the asset? | Producer | Sub-class, UsedBy, etc. |
| Temporal (process)/Internal | How was an asset produced (or should be produced)? | Producer, Standards | Process-specific (Waterfall, Spiral.) |
| Variations/Internal | What are the points at which the asset can be safely modified? | Producer | Variation points, variation features |
| Consumption/External | How an asset is being consumed by everyone? | Asset repository | UsageCount, Rating, Preferences |
| Solution/External | How was an asset consumed in a solution? | Consumer | Part-of-Design Patterns |
| Guidance/External | How an asset is to be consumed in an organization? | Organizational Standards | Design Rules, Guidance |

FIG. 2

SYSTEM AND METHOD TO ORGANIZE ASSETS IN A REPOSITORY

BACKGROUND

1. Field of the Invention

The embodiments of the invention provide a system and method to organize assets in a repository.

2. Description of the Related Art

Despite enormous progress in Services Oriented Architecture, Web Services and Semantic Web Architectures) in modeling, discovering, composing and deploying services, these cannot be directly used to realize their full potential for large-scale software reuse. This is because services, (encapsulating code implementations) are not the only thing that large applications are built upon. The process and intermediate deliverables also go into building a solution which reflects the perceived quality of the software. For example, services are built to specifications and tested to meet some quality guarantees. When a requirement to build a new application comes up, how to test it and what documentation to produce may be loosely defined. If one relies completely on a functional request specification to get potentially reusable services, the matched service may eventually be found unsuitable for the application.

SUMMARY

The embodiments of the invention provide a method of organizing assets having artifacts in a repository. The method begins by organizing artifacts of at least one of the assets as internal nodes in a graph based on a context. The method simultaneously organizes the assets as external nodes in the graph based on the context. The internal nodes comprise artifacts having metadata that is updated by an artifact producer and/or an asset producer. Moreover, the external nodes comprise artifacts that are defined and/or updated by roles other than the artifact producer and/or the asset producer.

Next, the internal and external nodes are combined to form a single set within the graph. The graph is dynamically updated and output to a user. Specifically, the graph includes internal edges representing relationships between the internal nodes. The internal edges are only changed by an asset producer. The graph also includes external edges representing relationships among the external nodes. The external edges are changed by roles other than the asset producer.

Furthermore, the outputting of the graph includes selecting a graph view from a plurality of graph views. The selecting of the graph view can include selecting an internal node packaging view, an internal node relationship view, and/or an internal node temporal view. The internal node packaging view includes relationships between an asset and artifacts of the asset. Moreover, the internal node relationship view includes relationships between each of the artifacts; and, the internal node temporal view includes the order of artifact production and/or the order of artifact usage. The selecting of the graph view can also include selecting an external node solution view between each of the assets and/or an external node consumption view of at least one of the assets. Additionally, the outputting of the graph includes querying the assets, and can query only the assets having artifacts in the graph view.

The embodiments herein also provide a system of organizing assets having artifacts in a repository. The system includes an organizer adapted to organize artifacts of at least one of the assets as internal nodes in a graph based on a context. The organizer simultaneously organizes the assets as external nodes in the graph based on the context. The internal nodes comprise artifacts having metadata that is updated by an artifact producer and/or an asset producer. Moreover, the external nodes comprise artifacts that are defined and/or updated by roles other than the artifact producer and/or the asset producer.

The system further includes a processor adapted to combine the internal and external nodes to form a single set within the graph. The graph includes internal edges representing relationships between the internal nodes, wherein the internal edges are only changed by the asset producer. Additionally, the graph includes external edges representing relationships among the external nodes, wherein the external edges are changed by roles other than the asset producer.

The processor is further adapted to update and output the graph to a user. The processor selects a graph view from a plurality of graph views and queries the assets. Only assets having artifacts in the graph view are queried. The processor can select an internal node packaging view, an internal node relationship view, and/or an internal node temporal view. The internal node packaging view includes relationships between an asset and artifacts of the asset. Moreover, the internal node relationship view includes relationships between each of the artifacts; and, the internal node temporal view includes the order of artifact production and/or the order of artifact usage. The processor can also select an external node solution view between each of the assets and/or an external node consumption view of at least one of the assets.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 1 illustrates a table of search terms, user intent, and number of results;

FIG. 2 illustrates a table of sample views;

DETAILED DESCRIPTION OF EMBODIMENTS

Figure 3:
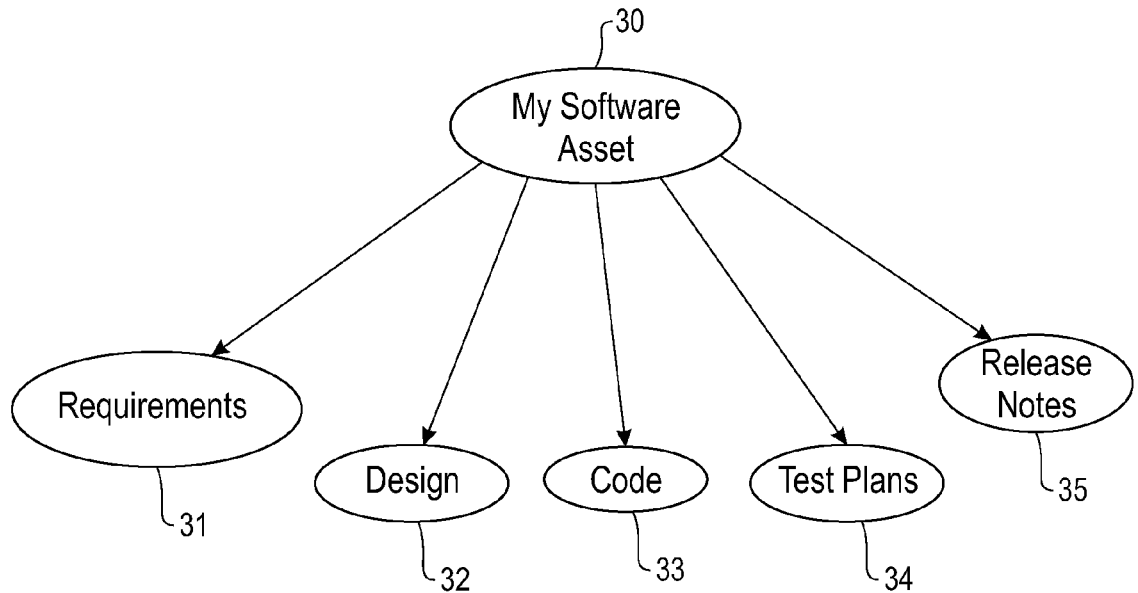
FIG. 3 illustrates a packaging view.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale.

Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Software organizations wanting to implement a systematic "reuse" program face the challenge of organizing and cataloging their software assets so that they can be retrieved in different contexts of usage across their divisions. With the advent of Services-Oriented Architectures (SOA), of which Web services is an example, software components are readily available as services on the web using standard protocols. However, service descriptions are usually only those that are provided by the service producers and unless a service producer has thought about all the contexts in which its service may be used, there is no guarantee that the service can be retrieved with high recall. The embodiments herein investigate how different contexts of asset consumption may be used for better asset modeling and discovery. The embodiments herein introduce an extensible set of consumption factors where the service descriptions may be provided by the service producer (or by other roles); implement a prototype that can evolve with the modeled factors; and demonstrate that the solution enables improved precision and recall for services available in a large-scale software organization. Systematic reuse has been an elusive goal for software development organizations. A challenge in reusing software is how to organize and catalog components that make up the software deliverable so that they can be retrieved in different contexts of usage across large divisions of an organization. SOA and semantic web standards help in modeling, discovering, composing, and deploying services and hold the promise of delivering large-scale software reuse. The embodiments herein call services and their collection of relevant artifacts assets and they become the building blocks to assemble large applications (which include composite services).

Typically, when a user queries for a service on any services/software repository, they are often disappointed because of various factors such as quality of service provided, incorrect results etc. The embodiments herein build a solution for an e-business website, and find a sorting program that can be used to sort an array of numbers (e.g., prices) or strings (e.g., item names). Sometimes a developer will search for the sorting program on a public site. The only ways to search for a sorting service is through the browser's search feature (of string comparison on fields) or manual inspection of all the service details. Let the developer now look at a public software search site that can contain more than 35,000 programs and have a keyword-based search interface. A simple and incomplete query using the keyword "sorting" (which represents the user's intent for exploring functionality) yields as many as 296 results as shown, for example in FIG. 1. It is not clear if any service in the results in FIG. 1 can sort numbers as well as text, provide interfaces to programs (executable) and additionally to source code, or have test cases and proper documentation—some criteria relevant for reusing any service in practice.

In order to narrow this search further, the user can provide precise keywords representing their intent, e.g., "sorting numbers", which results in just 12 results. A phrase such as "sorting program" yields 64 results. On the other hand, a phrase such as "sorting code numbers" yields no results. Some search engines also provide an advanced search facility, based on faceted search, wherein the user can specify categories such as author, category, operating system, etc. Such a facility helps to narrow the search somewhat, but does not provide any substantial improvement. It is not uncommon for the developer to go through all the entries individually to determine a potential reuse candidate, and many times decide to implement from scratch.

Services (encapsulating code implementations), are not the only factors considered that large applications are judged by. The process and intermediate deliverables also go into building a solution which reflects upon the perceived quality of the software. Services are built to specifications and tested to meet some quality guarantees. When a requirement to build a new application comes up, for example testing and documentation methodologies on how to test it and what documentation may be loosely defined. If the service repository focuses only on functional features to retrieve potentially reusable services, the matched service may eventually be found unsuitable for the application.

More generally, service descriptions are usually only those that are provided by the service producers and unless a producer has thought about all the contexts in which its service may be used, there is no guarantee that the service can be retrieved with high recall. Therefore, the user is neither sure that they have has the right service from the results that are returned by the repository (poor precision) nor sure that a service requirement exists when no results are returned (poor recall).

The embodiments herein find that a simple yet powerful idea for organizing services on any repository is to explicitly model the factors that influence the consumption of services into a hypergraph-model of service descriptions. The factors set the contexts for asset consumption, including searching and retrieving assets, for a new solution.

The embodiments herein introduce a useful and extensible set of consumption contexts for software assets. The contexts can be distinguished by which service description metadata they influence and who may provide them: the service producer or other roles like repository, consumer, etc. Moreover, the embodiments herein represent the consumption contexts as views on services metadata arranged as a hyper-graph. This approach is independent of any repository specific data model.

The embodiments herein also implement a search prototype over a repository with the modeled views, and the system can evolve with new views. Further, the embodiments herein demonstrate that the solution enables improved precision and recall for services available in a large-scale software organization. The embodiments herein first investigate the factors affecting the consumption of assets and model them as views. The embodiments herein also describe how the views could be used. Next, the embodiments herein provide architecture for providing multi-view search on a relational repository and implement the system.

An asset is something of potential value to a consumer. Assets can be divisible, meaning that constituents of the assets, also called artifacts, can also be of interest. An asset whose constituents are not of interest is considered to be indivisible. Typically, when an asset is selected for reuse, the objective of the asset consumer is to integrate the asset with other assets as part of an overall solution. One aspect of this integration is matching the functional description of the asset against the core functional requirements of the solution. However, this is an incomplete picture, since the embodiments herein also need to consider the context in which the asset has been developed and can be reused.

The collection of artifacts of an asset can be conceptually represented as a graph that supports multiple views of its representation. The vertices of the graph represents the artifacts (or assets). The edges of the graph have different semantics based on the view that is supported. The embodiments herein present a selection of views (name/type; primary concern; updated by; and meta-data examples) that are useful to describe contexts for software assets (see summary in FIG. 2).

These views are only representative and not exhaustive. The number of views could be potentially infinite, and limited only by the asset consumer's requirements. Views whose metadata are provided/updated by the asset producer (metadata examples) are called internal views and the others are external views.

The packaging view of an asset depicts the manner in which the asset artifacts have been physically packaged together for shipment to a potential consumer. By the very nature of asset transfer, this view would not allow for cyclic, non-terminating edges. The edges represent the contains (aggregates) relationship. Therefore, if there is an edge from artifact A (e.g., jar .le) to artifact B (class .le), A contains B. The packaging view represents the traditional directory structure of asset packaging familiar to most users of software products.

FIG. 3 illustrates a packaging view where a software asset 30 contains requirements 31, design 32, code 33, test plans 34, and release notes 35.

Figure 4:
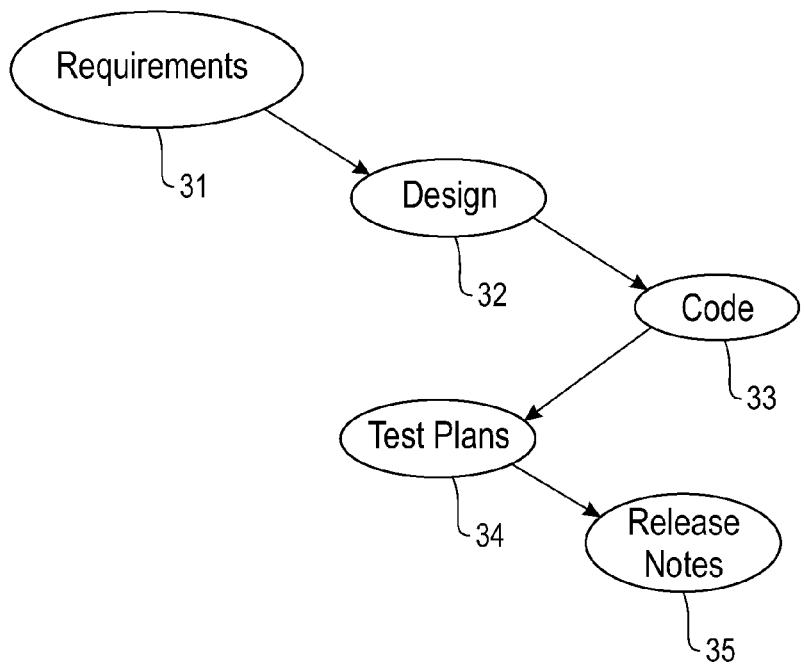
FIG. 4 illustrates a temporal view.

FIG. 4 illustrates a temporal view. The temporal view represents how the artifacts of an asset were assembled over time. For example, if a software asset (P) was developed using the Waterfall model, its requirements document (PR) 31 is first prepared in the requirements capture phase (WR) followed by design document (PD) 32 in the design phase (WD), followed by actual code (PI) 33 in the implementation phase (WI), followed by test plan (PT) 34 in the testing phase (WT), and eventually leading to the release notes (PM) 35 in the maintenance phase (WM). The edges represent causality. So the graph in this simplistic Waterfall example would be PR→PD→PI→PT→PM.

Figure 5:
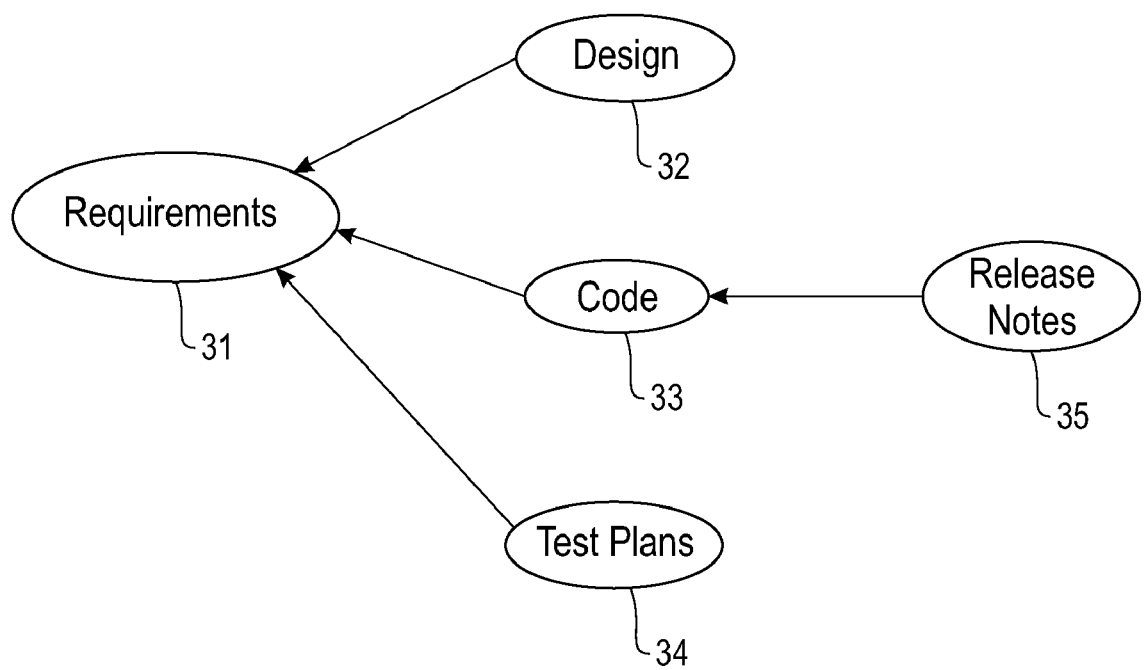
FIG. 5 illustrates a macro relationship view.

In the relationship view, a representation of the static and dynamic association of artifacts can be provided. In contrast to the Packaging view, there can be overlapping edges between the same nodes representing different relationships. The semantics of the edges depends on the level of modeling. FIG. 5 shows a macro level model where the relationships among the artifacts of the asset are shown. More specifically, the release notes 35 are an artifact of the code 33. The design 32, the code 33, and the test plans 34 are artifacts of the requirements 31.

Figure 6:
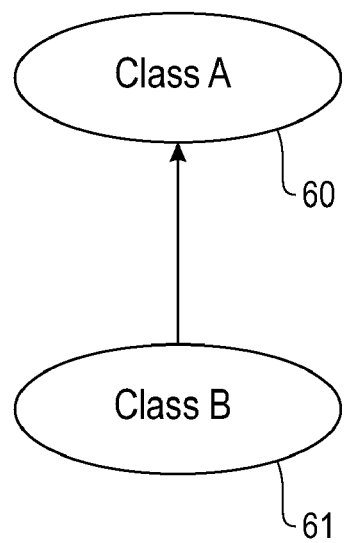
FIG. 6 illustrates a micro relationship view.

FIG. 6 illustrates a micro relationship view. An edge from class A 60 to class B 61 reflects that artifact A 60 depends on B 61. In accordance with the sorting program example previously described, class A 60 could represent the source code and class B 61 could represent the design document.

At the micro level of code artifacts, the edges can represent the inheritance and association relationship from UML Class diagrams for static relationship, and activity and sequence diagram for dynamic relationship. The edges in the relationship view can have cycles (not shown in FIGS. 5-6).

In a spiral development model, with multiple development cycles, the graph would capture the versions of the artifacts as follows:

$P_R^{v01} \to P_D^{v01} \to P_I^{v01} \to P_T^{v01} \to P_R^{v02} \to P_D^{v02} \to P_I^{v02} \to P_T^{v02} \to P_M$ reflecting the iterative nature of the spiral development process. Hence, the edges in the temporal view could have cycles, in case of iterative development in the spiral development model.

For the sorting program example, due to its relative simplicity, one can assume that it was developed using the waterfall model. Hence, the temporal view in FIG. 4 could simply represent the design document 32, source code 33, and test plans 34 for the sorting program.

The variations view is of special importance in situations where multiple variants of the same asset, perhaps slightly differing in terms of functionality, have to be stored. The nature of the variations among the assets would become a criterion for selecting the appropriate asset for reuse. Variants are not the same as storing different versions of the same asset, since different variants of an asset could be simultaneously evaluated for consumption; while in the case of versions, there is usually a default desirable version (e.g., latest). Such a representation necessitates the inclusion of a view where the nodes are the assets and the edges are the variant relationships. Each edge can be tagged with special metadata describing the nature of the variation. For example, a variation point provides the location in the source code of the asset where the variations have been introduced. Moreover, variation features provide the exact variations introduced at the variation point.

In some embodiments, a sorting program could have variation features such as sorting type (numeric or lexicographic sorting), sorting results (ascending or descending), etc. Each such variation feature would have to be identified with the appropriate variation point(s), e.g., sorting type would have to be identified with that part of the sorting program code that compares two elements before determining which precedes the other in the sorting order. Similarly, sorting results would have to be identified with that part of the sorting program which displays the results to the user.

The consumption view of an asset provides the potential user with information about the popularity of the asset as judged/perceived by other consumers. This view would capture information such as download count (the number of times the asset has been downloaded), consumption rating (evaluation by asset consumers on the quality of the downloaded asset), search hit (the keyword(s) that helped to locate the asset), search rank (average rank of successful hits—lower the rank, the less the asset is associated with the provided keywords), and so on. The information for the consumption view is updated by the repository and it would provide useful information as to how the asset is to be located and consumed.

With such a view, a user has flexibility to pose new types of search like finding the most highly rated and/or downloaded sorting algorithm.

In keeping with the spirit of Service-Oriented Architecture (SOA), a solution view of an asset is also provided. This view depicts how an asset can be used in a solution. In particular, it depicts the other assets that interact with the asset in question as part of the solution. It also depicts the nature of the interaction, which is a depiction of the business processes jointly executed by the asset and its interacting assets in the solution.

Figure 7:
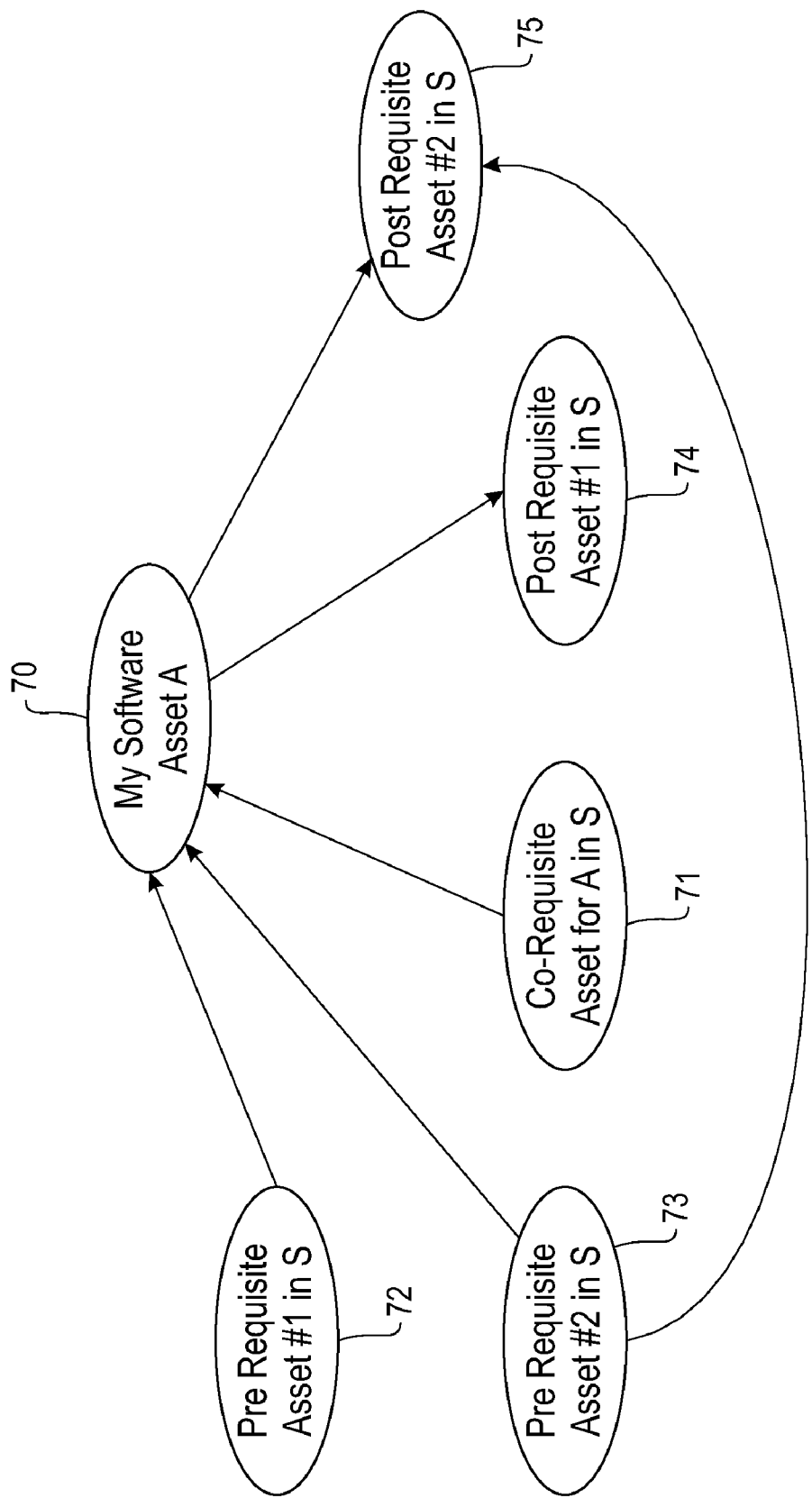
FIG. 7 illustrates a solution view.

FIG. 7 shows an example. Here, the solution view of an asset A 70 in a solution S depicts the relationship of A vis-a-vis the other assets in S. Three types of assets can exist in S.

First, co-requisite assets, C(S,A) 71 are provided, which should exist along with A in S, and on which A is dependent. Pre-requisite assets 72, 73, APre, are also provided, which are necessary assets for A to occur. For example, they may provide outputs that form the inputs to A. Existence of APre does not imply existence of A but existence of C(S,A) does imply it. Further, post-requisite assets 74, 75, APost, are provided which can become available if A is present. For example, A may provide outputs for these assets and thus enable the necessary conditions for their existence.

For each A, for every solution S to which A belongs, a solution view can be defined. For the sorting program example, a pre-requisite asset would be a program that supplies the elements to be sorted. Whereas, a post-requisite asset would be an asset that uses the result of the sorting program to select the first item in the sorted list for further processing (e.g., the vendor with the highest quote to be shortlisted for supplying a product).

The guidance view captures factors emerging from standards and guidance that a software development organization would like to impose on the assets that are produced (and consumed) by it. Typical examples of such guidance relate to design patterns, data management regulations and business policies.

Assets are searched and have to be retrieved in the contexts of their usage. A view captures a context and describes a consistent set of artifacts and relationships between them. The different, and relevant, views of the asset are arranged as a hyper-graph model by embodiments herein to describe how the view was built and how to possibly consume the view.

The contexts can be used during asset search for high precision and recall. For this, the contexts which are relevant to the user's needs are selected using a convenient interface and the user's criteria can be, explicitly or implicitly, specified in the contexts. The contexts are useful regardless of the search technology used (e.g., keywords, facets, relational) and the repository's data model.

The embodiments herein are sometimes referred to as the "MAM" approach (Multi-view Asset Modeling), whereas the basic keyword-based search without views is referred to as "non-MAM" approach. A query is referred as "MAM query".

The architecture of MAM (FIG. 8) comprises of three logical layers: Data Feed Layer 840 from where the information is retrieved, Multi-View Management Layer 820 and Search layer 800.

The data feed layer 840 accepts and converts available asset data from different channels into the system accepted format through the Data Feed layer. The channels include existing asset data repositories 851 (Asset Data feeder 854), multiple views related information (View Data feeder 852). In addition, provision is made for more types of data in future like domain ontological information about the assets (Ontology Data feeder 853) and search execution performance 855.

In the Multi-View Management Layer 820, based on the selected views, different contextual information for the asset are generated and managed. The metadata can be viewed as shown in item 860. In addition, this layer also interacts with appropriate data store (Asset Data Store 821, View Data Store 822, and Ontology Data Store 823) required for the various views 824.

Figure 8:
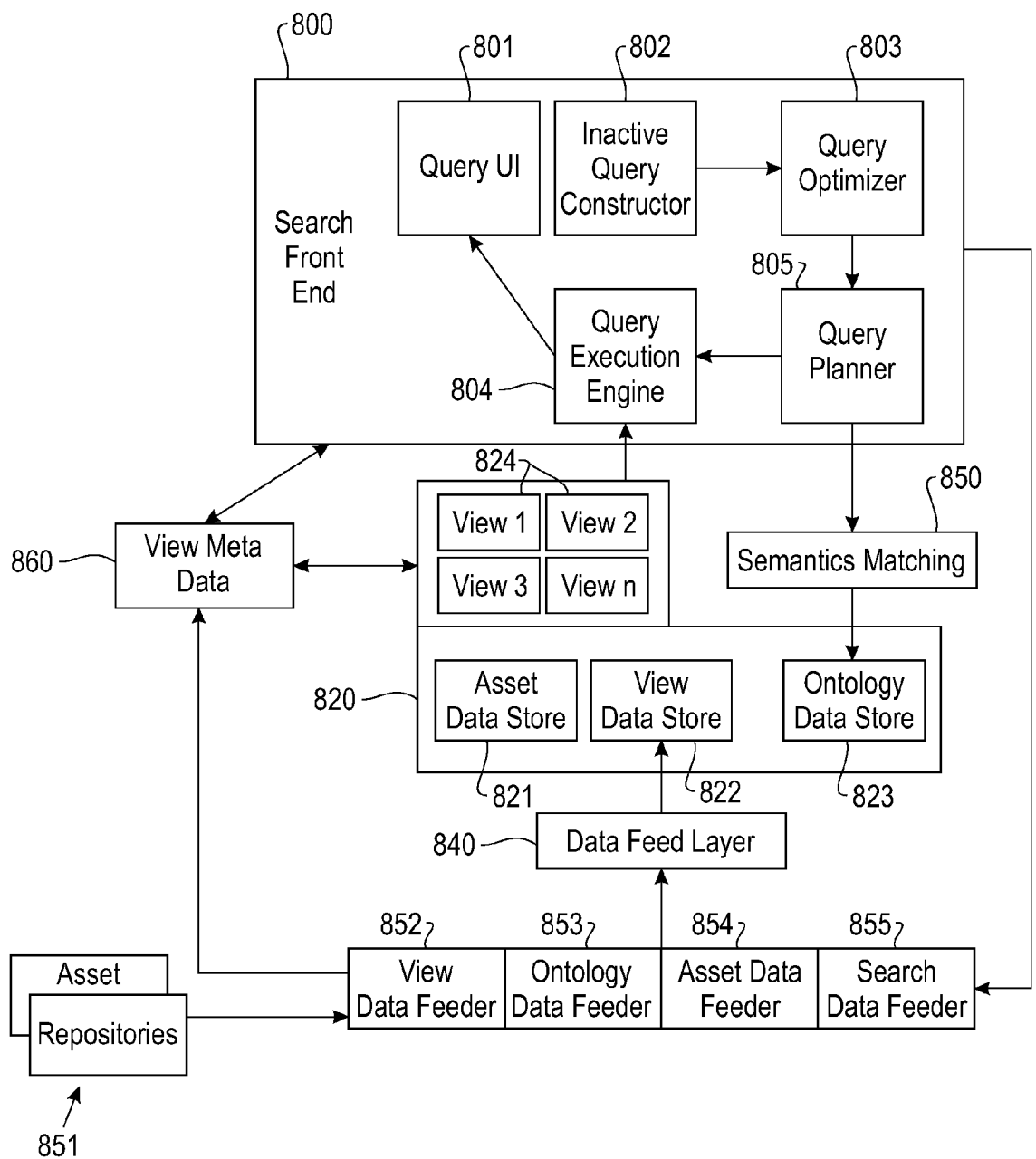
FIG. 8 illustrates a solution architecture.

The Search Layer 800 accepts the free text query from the user (Query User Interface 801), iterates with multiple interactive session to generate the basic query (i.e., non-MAM approach). It then parses the query to tokenize and generates optimized view specific query extensions, which are added to the basic query to construct the final query. This also supports the semantic matching (currently limited to exact, contains and similar match) of the user key words to the actual asset data as depicted in FIG. 8.

An operational view of the system triggered by a user search is now provided. The operations can include: QueryUI, IterativeQueryConstructor, QueryOptimizer, QueryParser and QueryExecutionEngine.

The QueryUI 801 component provides the Graphical user Interface that accepts the user search text in a simple prescribed format that helps in cataloging individual words under a specific category like (Asset Name, Asset Description, Industry sector, Owner name).

The IterativeQueryConstructor 802 checks the confidence of the user in terms of the closeness of the text with actual data in the databases and the user can specify options such as Exact Match, Contains, Similar, etc. Based on this information, the Basic Query is constructed. At this stage, the non-MAM approach is complete.

The QueryOptimizer 803 runs through the query and optimizes the query by iteratively asking the user to provide values (not additional search terms, but clear attributes listed) that are considered for further enhancement to multi-view specific Query (MAM Query).

The QueryParser 805 optionally invokes a Semantic matching module 850 (based on the user preference) that connects to an Ontology Datastore 823 to transform the query in terms of semantically closer terms that have a high percentage of hit.

The QueryExecutionEngine 804 executes the query, manages and encapsulates the database connection from the rest of the system and provides the search results in terms of the assets associated with the Unique Identifier retrieved from the Asset DataStore 821 and the views 824 associated with the assets that are populated to retrieve the results.

The traditional search on assets is based on Asset Name, Asset Description, Asset Author Name and so on. The iterativeQueryConstructor of the search layer, constructs the base Query (The base query is common for both MAM and non-MAM approaches) in the SQL format that matches to the user's intent and options (which is identified with iterative GUI based interactions with user). The QueryOptimizer gives the option to the user to switch to the MAM approach for further optimization of the search query. The QueryOptimizer asks values for additional information such as popularity index, Industry section, Variants, etc.

The user can either skip through this step (which is made possible through the GUI) to stay with the base query or the user can provide values for these attributes. The QueryExecutionEngine finally executes the query and provides the result to the user via a QueryUI.

The embodiments herein relate to the interesting but vexing problem of providing high precision and recall in a service-oriented repository of software assets. The traditional keyword-based and faceted search mechanisms are quite ineffective at this, because they do not consider the contexts in which the assets are consumed, i.e., consumption factors or consumption contexts. To that end, the embodiments herein utilize a view-based approach, wherein each view represents a particular consumption context from the point of view of the potential asset consumer. The embodiments herein provide improved precision and recall over the traditional methods.

Figure 9:
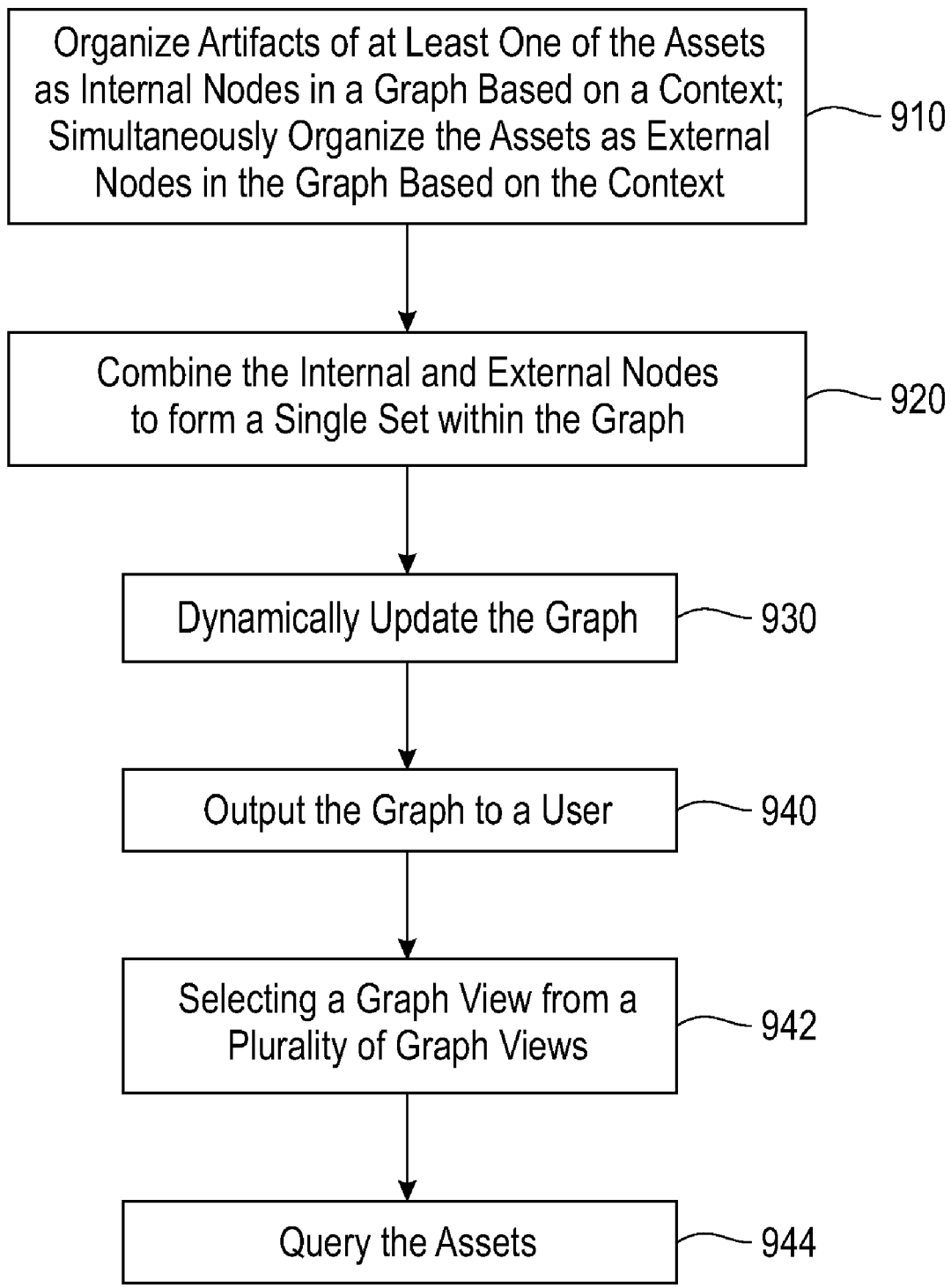
FIG. 9 illustrates a flow diagram of a method of organizing assets comprising artifacts in a repository.

FIG. 9 illustrates a flow diagram of a method of organizing assets comprising artifacts in a repository. The method begins, in item 910, by organizing artifacts of at least one of the assets as internal nodes in a graph based on a context. The method simultaneously organizes the assets as external nodes in the graph based on the context. The internal nodes comprise artifacts having metadata that is updated by an artifact producer and/or an asset producer. Moreover, the external nodes comprise artifacts that are defined and/or updated by roles other than an artifact producer and/or an asset producer.

Next, the internal and external nodes are combined to form a single set within the graph (item 920). The graph is dynamically updated (item 930) and output to a user (item 940). Specifically, the graph includes internal edges representing relationships between the internal nodes. The internal edges are only changed by an asset producer. The graph also includes external edges representing relationships among the external nodes. The external edges are changed by roles other than the asset producer.

Furthermore, the outputting of the graph includes selecting a graph view from a plurality of graph views (item 942). The selecting of the graph view can include selecting an internal node packaging view, an internal node relationship view, and/or an internal node temporal view. The internal node packaging view includes relationships between an asset and artifacts of the asset. Moreover, the internal node relationship view includes relationships between each of the artifacts; and, the internal node temporal view includes the order of artifact production and/or the order of artifact usage. The selecting of the graph view can also include selecting an external node solution view between each of the assets and/or an external node consumption view of at least one of the assets. Additionally, the outputting of the graph includes querying the assets (item 944), including only querying assets having artifacts in the graph view.

Another method of organizing assets having artifacts in a repository begins by organizing artifacts of at least one of the assets as internal nodes in a graph. The organizing of the artifacts can include calculating packaging views between the artifacts and one or more of the assets, such that the packaging views comprise relationships between the artifacts and the assets. Moreover, the organizing of the artifacts can include calculating relationship views between each of the artifacts, such that the relationship views comprise relationships between each of the artifacts. The organizing of the artifacts can also include calculating temporal views between the artifacts, the temporal views comprising an order of artifact production and/or an order of artifact usage. The packaging views, the relationship views, and the temporal views utilize the same internal nodes in the graph.

While organizing the artifacts, the method simultaneously organizes the assets as external nodes in the graph. This can include calculating solution views between each of the assets and/or calculating consumption views of one or more of the assets.

The calculating of the solution views can include calculating at least one pre-requisite asset of a first asset, wherein an output of the pre-requisite asset is utilized as an input in the first asset. Moreover, the calculating of the solution views can include calculating at least one co-requisite of the first asset, wherein the co-requisite exists along with the first asset, and wherein the first asset depends upon the co-requisite. The calculating of the solution views can also include calculating at least one post-requisite of the first asset, wherein output of the first asset is utilized as input in the post-requisite. Following this, the graph is output to a user.

The method also includes selecting the packaging views, the relationship views, the temporal views, the solution views, and/or the consumption views to produce a selected view. Next, the assets are queried, wherein only assets comprising artifacts in the selected view are queried.

Figure 10:
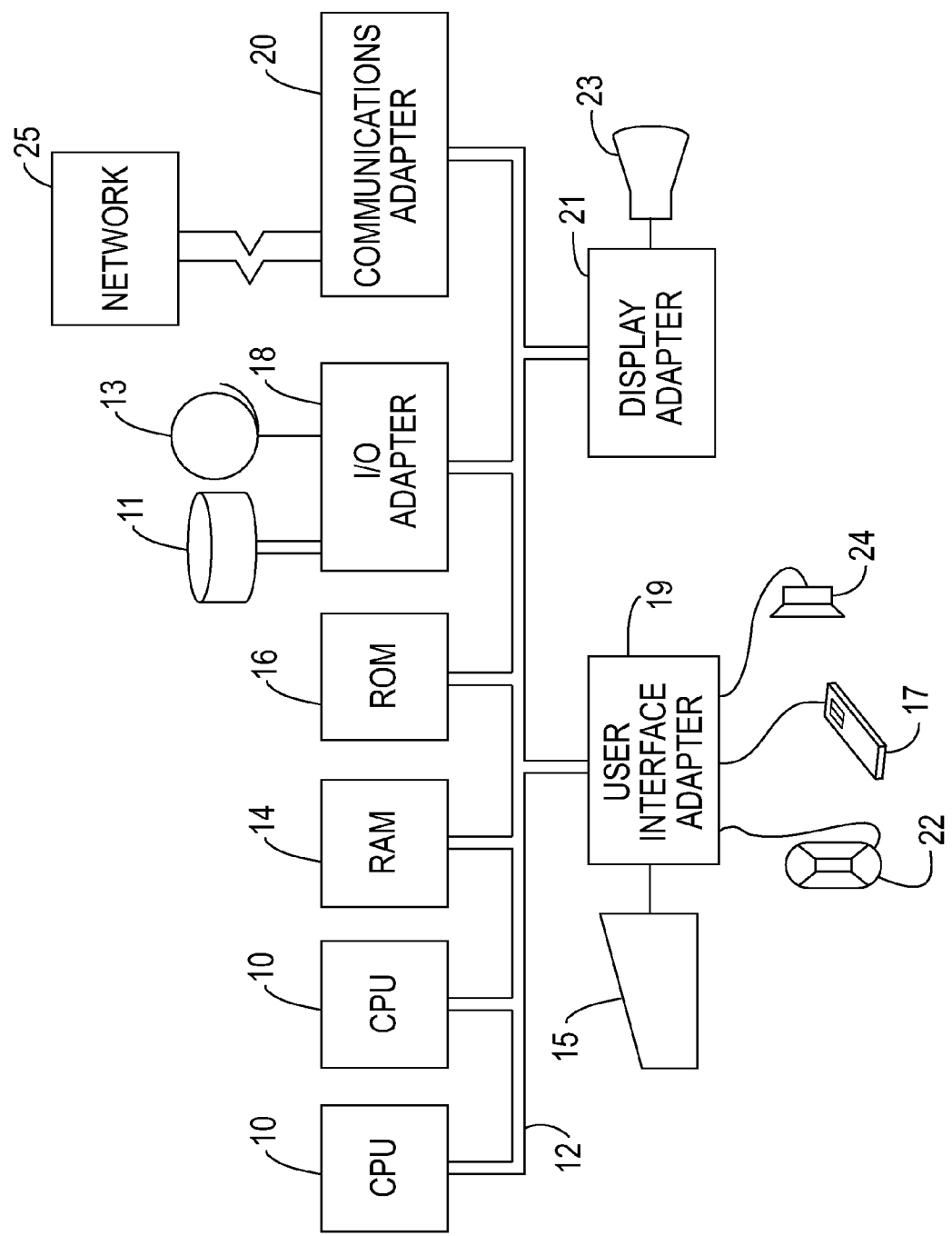
FIG. 10 is a hardware schematic diagram for operating the invention.

A representative hardware environment for practicing the embodiments of the invention is depicted in FIG. 10. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of organizing assets comprising artifacts in a repository, said method comprising:
   organizing, by a computer, artifacts of at least one of said assets as internal nodes in a graph based on a context, said internal nodes comprising artifacts comprising metadata that is updated by at least one of an artifact producer and an asset producer;
   simultaneously organizing, by said computer, said assets as external nodes in said graph based on said context, said external nodes comprising artifacts that are at least one of defined and updated by roles other than at least one of an artifact producer and an asset producer;
   combining, by said computer, said internal nodes and said external nodes to form a single set within said graph comprising internal edges representing relationships between said internal nodes, wherein said internal edges are only changed by an asset producer; and external edges representing relationships among said external nodes, wherein said external edges are changed by roles other than said asset producer;
   dynamically updating, by said computer, said graph; and
   outputting, by said computer, said graph to a user.

2. The method according to claim 1, said outputting of said graph comprising:
   selecting selecting a graph view from a plurality of graph views; and
   querying said assets, comprising only querying assets comprising artifacts in said graph view.

3. The method according to claim 2, said selecting of said graph view comprise comprising selecting at least one of:
   an internal node packaging view between at least one of said assets and artifacts of said at least one of said assets, such that said packaging view comprises relationships between said at least one of assets and said artifacts of said at least one of said assets;
   an internal node relationship view between each of said artifacts, such that said relationship view comprise relationships between each of said artifacts; and an internal node temporal view between said artifacts, such that said temporal view comprising at least one of an order of artifact production and an order of artifact usage.

4. The method according to claim 2, said selecting of said graph view comprising selecting at least one of:
an external node solution view between each of said assets; and
an external node consumption view of at least one of said assets.

5. A method of organizing assets comprising artifacts in a repository, said method comprising:
organizing, by a computer, artifacts of at least one of said assets as internal nodes in a graph based on a context, said internal nodes comprising artifacts comprising metadata that is updated by at least one of an artifact producer and an asset producer;
simultaneously organizing, by said computer, said assets as external nodes in said graph based on said context, said external nodes comprising artifacts that are at least one of defined and updated by roles other than at least one of an artifact producer and an asset producer;
combining, by said computer, said internal nodes and said external nodes to form a single set within said graph comprising internal edges representing relationships between said internal nodes, wherein said internal edges are only changed by an asset producer; and external edges representing relationships among said external nodes, wherein said external edges are changed by roles other than said asset producer;
dynamically updating, by said computer, said graph; and
outputting, by said computer, said graph to a user, said outputting comprising:
selecting a graph view from a plurality of graph views, and
querying said assets, comprising only querying assets comprising artifacts in said graph view.

6. The method according to claim 5, said selecting of said graph view comprising selecting at least one of:
an internal node packaging view between at least one of said assets and artifacts of said at least one of said assets, such that said packaging view comprises relationships between said at least one of assets and said artifacts of said at least one of said assets;
an internal node relationship view between each of said artifacts, such that said relationship view comprise relationships between each of said artifacts; and
an internal node temporal view between said artifacts, such that said temporal view comprising at least one of an order of artifact production and an order of artifact usage.

7. The method according to claim 5, said selecting of said graph view comprising selecting at least one of:
an external node solution view between each of said assets; and
an external node consumption view of at least one of said assets.

8. A computer system comprising:
a memory that stores a graph; and
a processor that:
organizes artifacts of at least one of said assets as internal nodes in a graph based on a context, said internal nodes comprising artifacts comprising metadata that is updated by at least one of an artifact producer and an asset producer;
simultaneously organizes said assets as external nodes in said graph based on said context, said external nodes comprising artifacts that are at least one of defined and updated by roles other than at least one of an artifact producer and an asset producer;
combines said internal nodes and said external nodes to form a single set within said graph comprising internal edges representing relationships between said internal nodes, wherein said internal edges are only changed by an asset producer; and external edges representing relationships among said external nodes, wherein said external edges are changed by roles other than said asset producer;
dynamically updates said graph; and
outputs said graph to a user.

9. A non-transitory computer program storage device readable by computer, tangibly embodying a program of instructions executable by said computer to perform a method of organizing assets comprising artifacts in a repository, said method comprising:
organizing artifacts of at least one of said assets as internal nodes in a graph based on a context, said internal nodes comprising artifacts comprising metadata that is updated by at least one of an artifact producer and an asset producer;
simultaneously organizing said assets as external nodes in said graph based on said context, said external nodes comprising artifacts that are at least one of defined and updated by roles other than at least one of an artifact producer and an asset producer;
combining said internal nodes and said external nodes to form a single set within said graph comprising internal edges representing relationships between said internal nodes, wherein said internal edges are only changed by an asset producer; and external edges representing relationships among said external nodes, wherein said external edges are changed by roles other than said asset producer;
dynamically updating said graph; and
outputting said graph to a user.

* * * * *